June 21, 1927.
C. A. WHITSETT
1,633,148
SPOTLIGHT
Filed Dec. 26, 1922    2 Sheets-Sheet 1
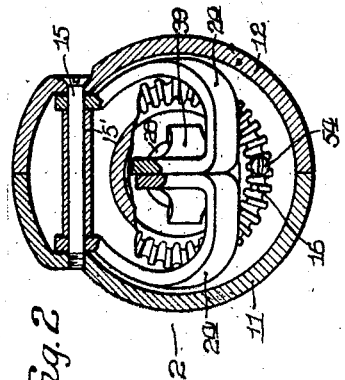
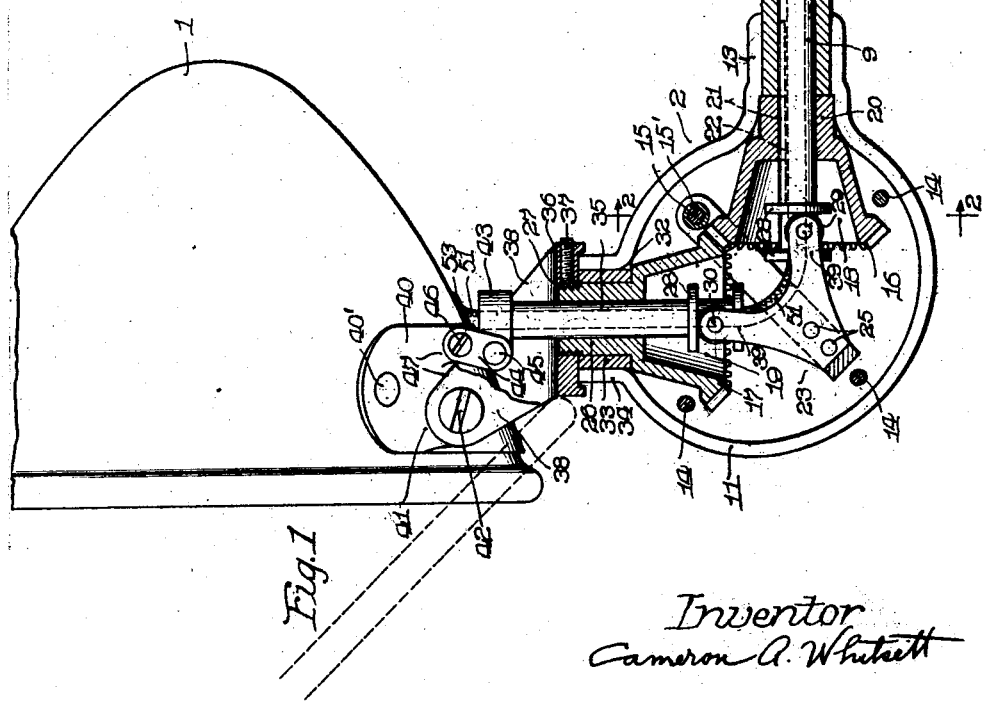
Inventor
Cameron A. Whitsett June 21, 1927.
C. A. WHITSETT
1,633,148
SPOTLIGHT
Filed Dec. 26, 1922
2 Sheets-Sheet 2
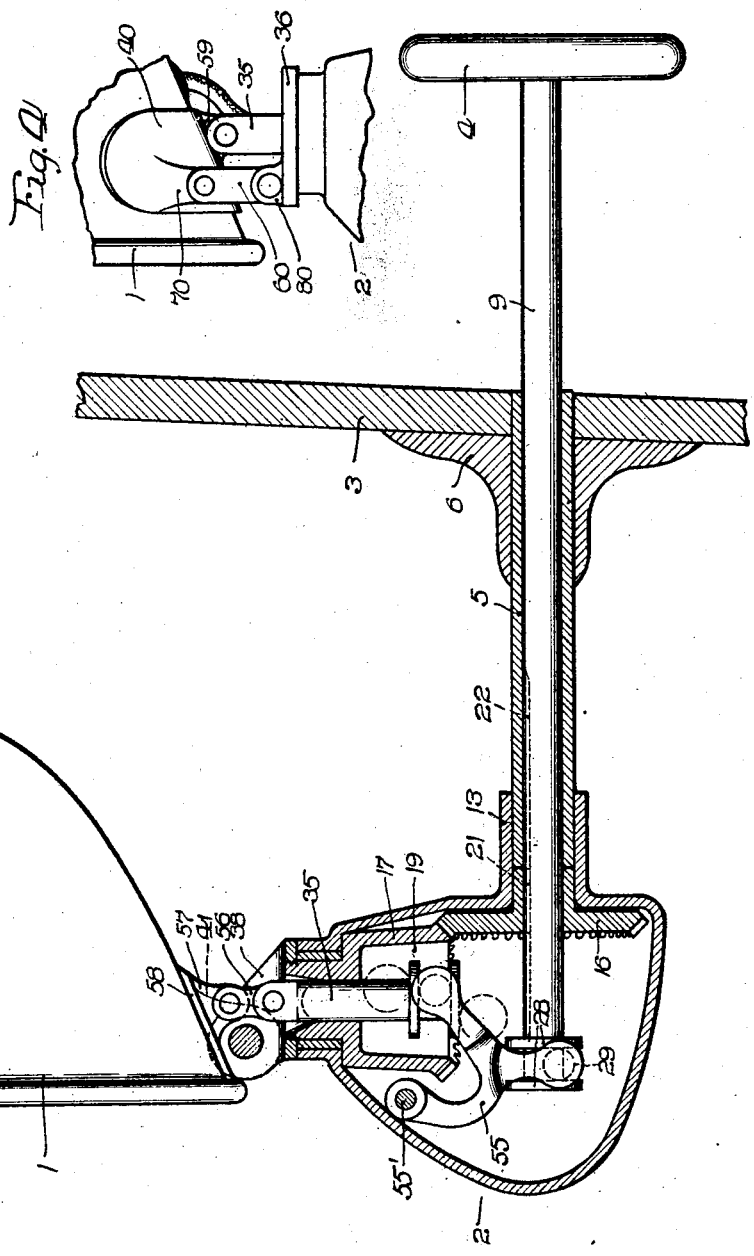
Inventor
Cameron A. Whitsett Patented June 21, 1927.

1,633,148

UNITED STATES PATENT OFFICE.

CAMERON A. WHITSETT, OF CHICAGO, ILLINOIS.

SPOTLIGHT.

Application filed December 26, 1922. Serial No. 608,906.

The present invention relates generally to spot lights, and more particularly to those devices known in the trade as inside controlled spot lights for use on closed cars, wherein the spot light proper is positioned outside of the closed body and the control means for adjusting the spot light is positioned inside of the closed body in convenient position for operation by the driver.

It is the fundamental object of the present invention to provide improved control mechanism for spot lights of this type, which will be operable with the greatest ease and facility.

Other subsidiary objects will appear in the following description taken in connection with the accompanying drawings, in which:

Fig. 1 is a longitudinal sectional view through one form of my invention;

Fig. 2 is a transverse sectional view taken approximately on the plane of the line 2—2 of Fig. 1, but showing a portion of the bell crank lever in elevation;

Fig. 3 is a longitudinal sectional view of a form similar to Fig. 1; and

Fig. 4 illustrates a modified link type of mounting which can be employed for supporting the spot lights of either Figures 1 or 3.

Referring first to the embodiment shown in Figs. 1 and 2, the spot light proper is designated 1 and this spot light has adjustable mounting on a housing 2 supported in front or to the side of the automobile windshield 3. The single operating handle 4, which gives all adjustments to the spot light, is disposed inside of the closed body at a convenient position for operation by the driver. The outer housing 2 is carried on the outer end of a tubular supporting stem 5 having either bracket extensions or a mounting plate 6 for attachment by screws 7 to one of the corner posts at the corner of the closed body, or to one of the marginal rails circumscribing the windshield, said corner post or rail being designated 8. The operating handle 4 is carried on the inner end of an operating shaft 9 which extends through the supporting sleeve or stem 5 and enters the outer housing 2. In the arrangement shown, it is only necessary to extend this operating shaft 9 into the interior of the car, this operating shaft having two operating motions and dispensing with the necessity of any outer operating or locking sleeve or similar parts entering the body of the car. As a consequence, only a comparatively small hole 10 need be provided in the windshield, windshield rail, or corner post, for introducing the control mechanism into the interior of the car. In accordance with the preferred form of mounting desired, this hole 10 may be extended through the corner post, the windshield rail, or the windshield proper, and when extended through the windshield a rubber washer or gasket 10' may snugly hug the shaft 9 and face the outer end of the hole 10, or may even be extended back through the hole between the glass 3 and shaft 9. This rubber gasket excludes rain and prevents any vibration of the shaft 9 from injuring the glass 3.

The outer housing 2 is of generally spherical form, and is split into left and right halves 11 and 12 on the vertical axial plane of the supporting sleeve 5. Both sections 11 and 12 are formed with the cooperating halves of a hub 13 which snugly embraces the outer end of the supporting sleeve 5. A plurality of screws 14 extend through from side to side of the casing and firmly couple the two halves together, thereby rigidly clamping the hub portions 13 to the outer end of the supporting sleeve 5. A pivot pin or screw 15 also extends between the two casing sections for clamping the same together, this pin having the additional function of a pivotal center for the bell crank lever 23, as I shall presently describe.

The rotational motion of the operating handle 4 is translated into horizontal swinging motion of the spot light 1 through the medium of two meshing bevel gears 16 and 17 in the housing 2. It will be observed that the toothed peripheries of these gears are flared outwardly from hub portions, so as to provide annular recesses 18 and 19 in the faces of the gears. These recesses accommodate the angular motion of the bell crank lever 23 in the tilting motion of the lamp. The hub 20 of the gear 16 is provided with an inwardly extending spline or key 21 which engages in a longitudinal keyway 22 cut through a considerable length of the operating shaft 9, thereby permitting longitudinal motion of the shaft relative to the gear, but affording a direct connection for transmitting rotational motion from the shaft to the gear. The hub 26 of the upper gear 17 is journaled in a bearing ring 33 which is clamped between the opposing hub sections 34 formed on each of the housing sections 11 and 12. The upper end of the hub 26 is threaded at 27 for the reception of a suitable lamp supporting bracket comprising the substantially annular mounting plate 36 and the two upwardly extending fork arms 38—38, between which the lamp 1 is pivoted. A set screw 37 rigidly secures the plate 36 to the gear hub 26 after the plate has been screwed down over the gear hub for drawing the shoulder 32 on the gear up against the bottom of the bearing ring 33. The threaded connection 27 between the gear hub 26 and plate 36, and the set screw 37, enable any desired tension to be placed on the bearing ring 33 for eliminating rattle and taking up wear, it being noted that adjustments for the latter purpose can be performed by the mere rotation of the plate 36 without necessitating the disassembling of the housing 2. A stem or shaft 35 extends upwardly through the gear hub 26 for transmitting the reciprocatory motion of the shaft 9 to the lamp 1 through the medium of the bell crank lever 23. It will be noted that the inner end of the shaft 9 has a pair of spaced collars 28 mounted thereon, and the lower end of the stem 35 has a similar pair of collars 28. Discs 29 engage between the collars 28 on each of the shafts 9 and 35, these discs being secured by rivets 30 to the ends of the bell crank arms. This bell crank lever is preferably made of two stampings 24—24 (Fig. 2), which are riveted together by pins or rivets 25. Each half of the bell crank lever has an upwardly extending arm which has pivotal support on the pivot pin 15, and also has arms 39 extending along each of the shafts 9 and 35, just outside of the collars 28. A spacing sleeve 15' spaces the upper arms on the pivot pin 15. Each arm 39 has riveted thereto a disc 29, as before described, whereby the two opposing arms 39 on each of the lever sections form a yoke or fork which extends forwardly over the end of the shaft and snugly embraces the outer collar 28 for disposing the discs 29 between the collars. This connection between the shafts and the bell crank lever permits free rotation of both of the shafts 9 and 35 for horizontal adjustment of the lamp without disturbing the bell crank lever 23, or any vertical adjustment which has been previously given the lamp.

The lamp 1 is preferably mounted between the upper fork arms 38 by securing a saddle strap 40 to the lamp, as by rivets 40' and pivoting this saddle strap between the fork arms 38. The strap 40 passes down under the bottom of the lamp and to either side thereof, having depending pivot lugs 41 which receive pivot screws 42 passing through the fork arms 38 and tapping into the pivot lugs 41 on each side of the lamp. The vertical reciprocatory motion of the shaft or stem 35 is transmitted to the lamp through a collar 43 which is rigidly secured to the upper end of the stem. This collar has pivotal connection with the strap 40 through a pair of links 44 which make pivotal connection with the collar 43 and with the strap on each side of the lamp. Each link 44 has connection at its lower end to a pivot pin 45 passing through the collar 43 from side to side and making connection with both links. The upper end of each link has connection through a pivot screw 46 with a pivot lug 47 extending downwardly from the strap 40. It will be noted that the pivotal axis of the two screws 46 is in close proximity to the pivotal axis of the two main pivot screws 42, so that a comparatively small range of reciprocal motion of the shaft 35 is operative to tilt the lamp backwardly or forwardly through a wide angle. For example, the lamp can be tilted forwardly to approximately the dotted line position indicated, and can be tilted backwardly to the same degree.

The electric circuit for the bulb within the lamp 1 is established through a duplex conductor 51 which enters the hollow shaft 9 through a lateral opening 52 adjacent the handle end of the shaft. This conductor is then extended out of the other end of the shaft 9 and up through the V-shaped trough formed at the juncture of the two lever sections 24, into the lower end of the hollow stem 35. Extending through this hollow stem, the conductor 51 passes out of the upper end of the stem and enters a bushing 53 in the bottom of the lamp shell for connection with the bulb.

In the operation of the lamp, the rotation of the operating handle 4 will rotate the lamp to any position to right or left; it will be apparent that the lamp can be rotated through a complete revolution or even more, and it may be advisable to provide a limiting stop so that the conductor 51 will not be wound upon the shaft 9 or broken. Such a limiting stop can be obtained by filling one of the tooth spaces of either gear 16 or 17 with a slug, screw or the like, such as indicated at 54 in Fig. 2, so that the lamp will be capable of rotating through substantially a complete circle but further motion will be obstructed by this filled tooth space striking the corresponding tooth in the cooperating gear. Vertical adjustment of the lamp is obtained by a horizontal translatory motion of the operating handle 4 through pulling or pushing of the control handle towards or away from the driver. By a combination of the translatory and rotational motions of the operating handle 4 the lamp can be focused on the desired spot very quickly. It will also be noted, that any vertical inclination which has been given the lamp can be maintained while the lamp is swung through its horizontal plane, whereby upwardly or downwardly extending circles of any desired radius can be inscribed with the light rays in searching for any particular object. Moreover, when the light has been revolved to bear in the general direction of the object being sought, the lamp can be rocked to throw the light ray upwardly or downwardly in this directional plane by the simple pulling and pushing of the control handle 4.

In Fig. 3 the bell crank lever 55 is pivoted at 55′ in the front part of the housing and in this form only the upper gear 17 is recessed for receiving the collars 28. The arms of this bell crank lever are each forked to engage over opposite sides of the shaft and stem, as described of the previous embodiment. The upper end of the stem 35 has pivotal connection with a link 56, which in turn has pivotal connection with a lug 57 extending from a plate 58 analogous to the strap 40. Lugs 41 extend down from this plate for pivotal connection with the bracket arms 38. The electrical conductor can be extended through the shaft 9 and stem 35 as before described, if such is desired. In Fig. 4 I have illustrated an alternative method of mounting the spot light on the bracket 36, which method is applicable to either of the constructions shown in Figs. 1 or 3. The stem 35 has direct pivotal attachment to the lamp through a central ear 59 depending from the saddle strap 40. The connection to the bracket plate is through links 60, of which there is one on each side of the lamp. These links are pivoted to ears 70 on the strap 40, and to pivot lugs 80 on the bracket plate 36.

I do not intend to be limited to the details herein shown and described except as they are defined in the appended claims.

I claim :—

1. In an inside-control spot light, the combination of an operating shaft adapted to extend from the inside to the outside of the car body, a housing over the outer end of said shaft, an operating handle on the inner end of said shaft, said shaft having rotational and rectilinear motions, a bevel gear on said shaft within said housing, a second bevel gear driven by said first bevel gear, a bracket rotated by said second bevel gear, a spot light pivotally mounted on said bracket, a reciprocable stem, means for operatively connecting said stem with said spot light for inclining said light, and means for transmitting motion from said shaft to said stem comprising an arm pivoted within said housing and operatively connected with said shaft and said stem.

2. In an inside control spotlight, the combination of a housing adapted for stationary mounting on the automobile, a rotatable and reciprocable operating shaft entering said housing and adapted for manipulation from the inside of the car, a mounting bracket supported on said housing, a spotlight pivotally supported on said mounting bracket, a first bevel gear connected with said mounting bracket and disposed inside of said housing, a second bevel gear disposed concentrically of said operating shaft and meshing with said first bevel gear, key means between said second bevel gear and said shaft compelling rotation of said second bevel gear with said shaft but permitting reciprocation of said shaft relative thereto, a reciprocable stem passing through said mounting bracket and pivotally connected to said spotlight, and lever means in said housing operatively joining said shaft with said reciprocable stem.

3. In an inside control spotlight, the combination of a housing adapted for stationary mounting on the automobile body, an axially rotatable and reciprocable operating shaft entering said housing, an operating handle on said shaft adapted for manipulation from the inside of the car, a mounting bracket journaled in said housing, a spotlight pivotally supported on said mounting bracket, a first bevel gear inside said housing and operatively connected to said mounting bracket, a second bevel gear inside said housing and concentric with said operating shaft, said two bevel gears being retained in continuous mesh, a reciprocable stem passing through said mounting bracket, means pivotally connecting the outer end of said stem to said spotlight, collars on the inner end of said stem, collars on the inner end of said operating shaft, forked lever means pivotally supported in said housing having fork pins engaging between said collars, and means compelling rotation of said second bevel gear with said operating shaft but permitting free reciprocation of said shaft in said second bevel gear.

4. In an inside-control spotlight, the combination of an operating shaft adapted to extend from the inside to the outside of the car body, a housing over the outer end of said shaft, an operating handle on the inner end of said shaft, said shaft having rotational and rectilinear motions, a first gear on said shaft within said housing, a second gear driven by said first gear, a bracket rotated by said second gear, a spotlight pivotally mounted on said bracket, a reciprocable stem, means for operatively connecting said stem with said spotlight for inclining said light, and means for transmitting motion from said shaft to said stem comprising an arm pivoted within said housing and operatively connected with said shaft and said stem.

5. In a spotlight of the class described, the combination of an operating shaft, an operating handle mounted thereon, supporting means for supporting said shaft, said shaft and handle having rotational motion and a push and pull rectilinear motion, a gear on said shaft adjacent its outer end, said gear being rotated by the rotational motion of said handle, a second gear carried by said supporting means and driven by said first gear, a spotlight rotated by said second gear, a reciprocable stem passing substantially axially through said second gear and operatively connected to said spotlight, and means comprising a pivoted arm for transmitting the push and pull motion of said handle and shaft to said stem.

6. In a spotlight of the class described, the combination of an operating shaft, an operating handle mounted thereon, a housing for the outer end of said shaft, said shaft and handle having rotational motion and a push and pull rectilinear motion, a gear on said shaft adjacent its outer end, said gear being rotated by the rotational motion of said handle, said shaft moving freely in said gear in the push and pull rectilinear motion of said handle, a second gear pivotally supported by said housing and driven by said first gear, a spotlight rotated by said second gear, a reciprocable stem having one end disposed in said housing and the other end pivotally connected to said spotlight, and means comprising an arm pivoted within said housing and operatively connected with said shaft and said stem for transmitting the push and pull motion of said handle and shaft to said stem.

7. In an inside-control spotlight, the combination of a supporting member adapted for attachment to a car body and comprising a housing adjacent its outer end, a shaft guided in said housing, an operating handle mounted on said shaft, said shaft and handle having rotational motion and a push and pull rectilinear motion, a first bevel gear on said shaft adjacent its outer end, said gear being rotated by the rotational motion of said handle, a second bevel gear journalled in said housing and driven by said first bevel gear, a spotlight rotated by said second bevel gear, a reciprocable stem passing axially through said second bevel gear, pivot means operatively connecting the outer end of said stem to said spotlight, a lever having operative connection with said shaft and said stem for transmitting the push and pull motion of said handle to said stem, and a pivot for said lever located in back of one of said bevel gears.

In witness whereof, I hereunto subscribe my name this 7th day of April, 1922.

CAMERON A. WHITSETT.